United States Patent [19]
Chandler

[11] Patent Number: 5,704,078
[45] Date of Patent: Jan. 6, 1998

[54] PORTABLE SINK

[76] Inventor: Velma Chandler, P.O. Box 333, Starke, Fla. 32091

[21] Appl. No.: 628,153

[22] Filed: Apr. 5, 1996

[51] Int. Cl.$^6$ .................... A47K 11/02; A47K 1/02
[52] U.S. Cl. .................... 4/449; 4/625; 4/626; 4/630; 4/638
[58] Field of Search .................. 4/449, 459, 476, 4/479, 482, 483, 516, 518, 619, 625, 626, 630, 638, 664, 665

[56] References Cited

U.S. PATENT DOCUMENTS 4,769,863  9/1988  Tegg et al. .................... 4/625
5,528,776  6/1996  Carmichael .................... 4/516

FOREIGN PATENT DOCUMENTS 2271581  4/1994  United Kingdom .................... 4/449

Primary Examiner—Robert M. Fetsuga

[57] ABSTRACT

A portable sink is particularly adapted for use in a portable toilet and includes a cabinet in which a conventional five gallon bottle of water can be retained. The sink is designed to drain into the portable toilet, and a supply of deodorizing soap operates to both clean a user's hands and deodorize the entire portable toilet assembly. Suction cups are provided on rear and bottom surfaces of the sink to facilitate its attachment to the plastic housing of the portable toilet, and adjustable brackets mounted on magnetic supports allow the brackets to be positioned to fit virtually any manufactured shape of water bottle.

8 Claims, 3 Drawing Sheets

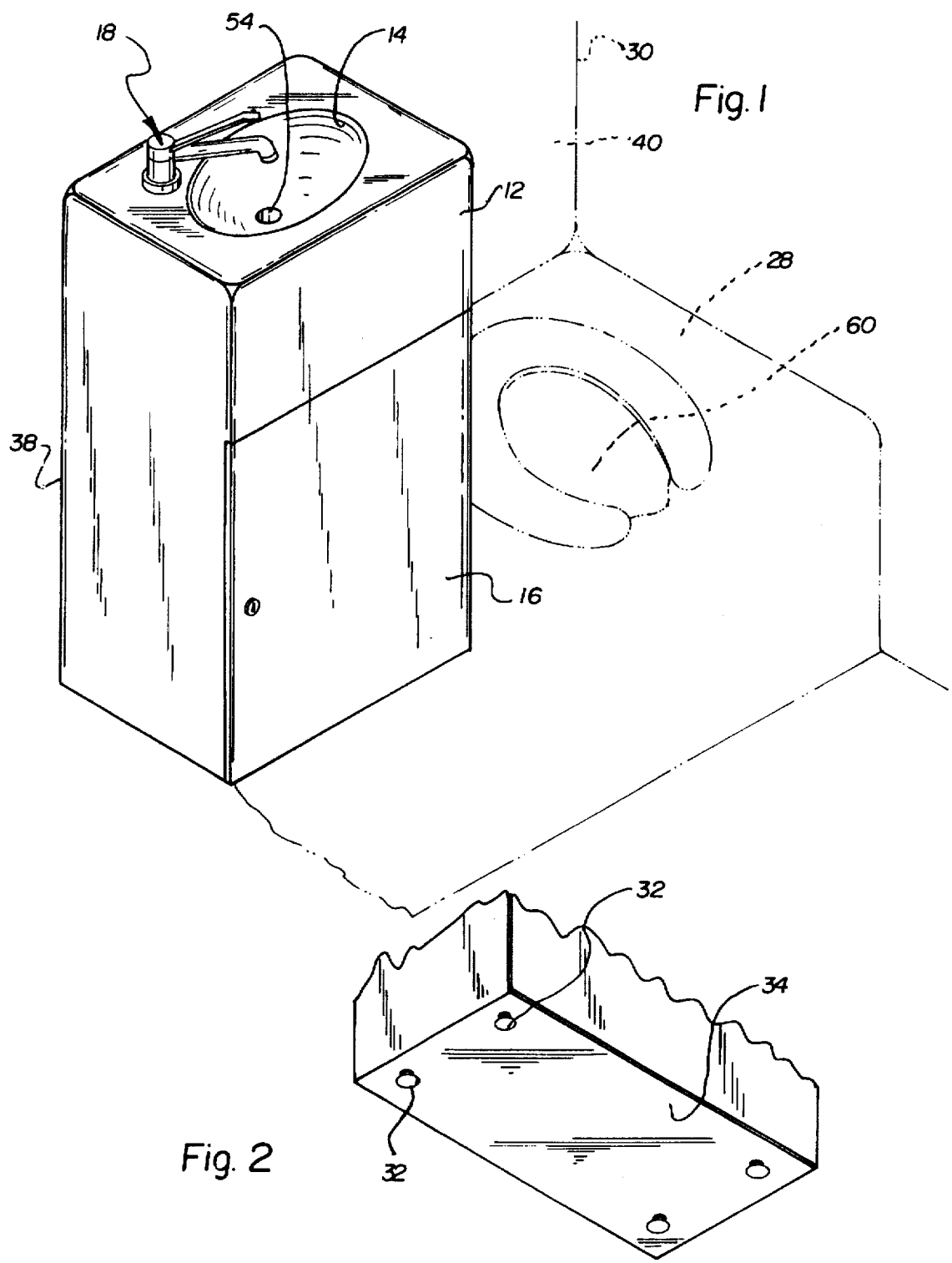

PORTABLE SINK

BACKGROUND OF THE INVENTION

1. Field of the Invention

The present invention pertains to portable sinks, and more particularly pertains to a portable sink construction which is particularly well adapted for use in a portable toilet.

2. Description of the Prior Art

The use of portable sinks is well known in the prior art, and this is evidenced by the granting of a number of patents relating to various functional and structural aspects of such portable sinks. Typical examples of patents relating to portable sinks include U.S. Pat. No. 4,747,169 which issued to Valbuena on May 31, 1988; U.S. Pat. No. 5,301,376 which issued to Herbert on Apr. 12, 1994; U.S. Pat. No. 4,766,621 which issued to Rasor on Aug. 30, 1988; and U.S. Design Pat. No. 250,595 which issued to Tebbe et al. on Dec. 19, 1978.

While each of these prior art patents disclose devices which fulfill their respective particular objectives and requirements, and are most likely quite functional for their intended purposes, it will be noticed that none of these patents disclose a portable sink construction which is particularly designed for use in a portable toilet. Recognizing the fact that the need for portable sinks and portable toilets does exist, there apparently exists the need for inventions which would solve this problem. In this respect, the present invention substantially fulfills this need.

SUMMARY OF THE INVENTION

In view of the foregoing disadvantages inherent in the known types of portable sinks now present in the prior art, the present invention provides a new portable sink having advantages and improvements which are patentably distinct over similar devices and methods which may already be patented or commercially available. As such, the general purpose of the present invention, which will be described subsequently in greater detail, is to provide a portable sink and method which has many of the advantages of the portable sinks mentioned heretofore while being operable to overcome problems not presently addressed by the prior art.

To attain this, the present invention generally comprises a portable sink which is particularly adapted for use in a portable toilet includes a cabinet in which a conventional five gallon bottle of water can be retained. The sink is designed to drain into the portable toilet, and a supply of deodorizing soap operates to both clean a user's hands and deodorize the entire portable toilet assembly. Suction cups are provided on rear and bottom surfaces of the sink to facilitate its attachment to the plastic housing of the portable toilet, and adjustable brackets mounted on magnetic supports allow the brackets to be positioned to fit virtually any manufactured shape of water bottle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable sink and method which has many of the advantages of the portable sinks mentioned heretofore and many novel features that result in a portable sink which solves problems not presently addressed in the prior art.

It is another object of the present invention to provide a new portable sink which may be easily and efficiently manufactured and marketed.

It is a further object of the present invention to provide a new portable sink which is of a durable and reliable construction.

An even further object of the present invention is to provide a new portable sink which is susceptible of a low cost of manufacture with regard to both materials and labor, and which accordingly is then susceptible of low prices of sale to the consuming public, thereby making such portable sink economically available to the buying public.

Still yet another object of the present invention is to provide a new portable sink which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the portable sink comprising the present invention.

FIG. 2 is a bottom perspective view thereof.

DESCRIPTION OF PREFERRED EMBODIMENTS

Figure 3:
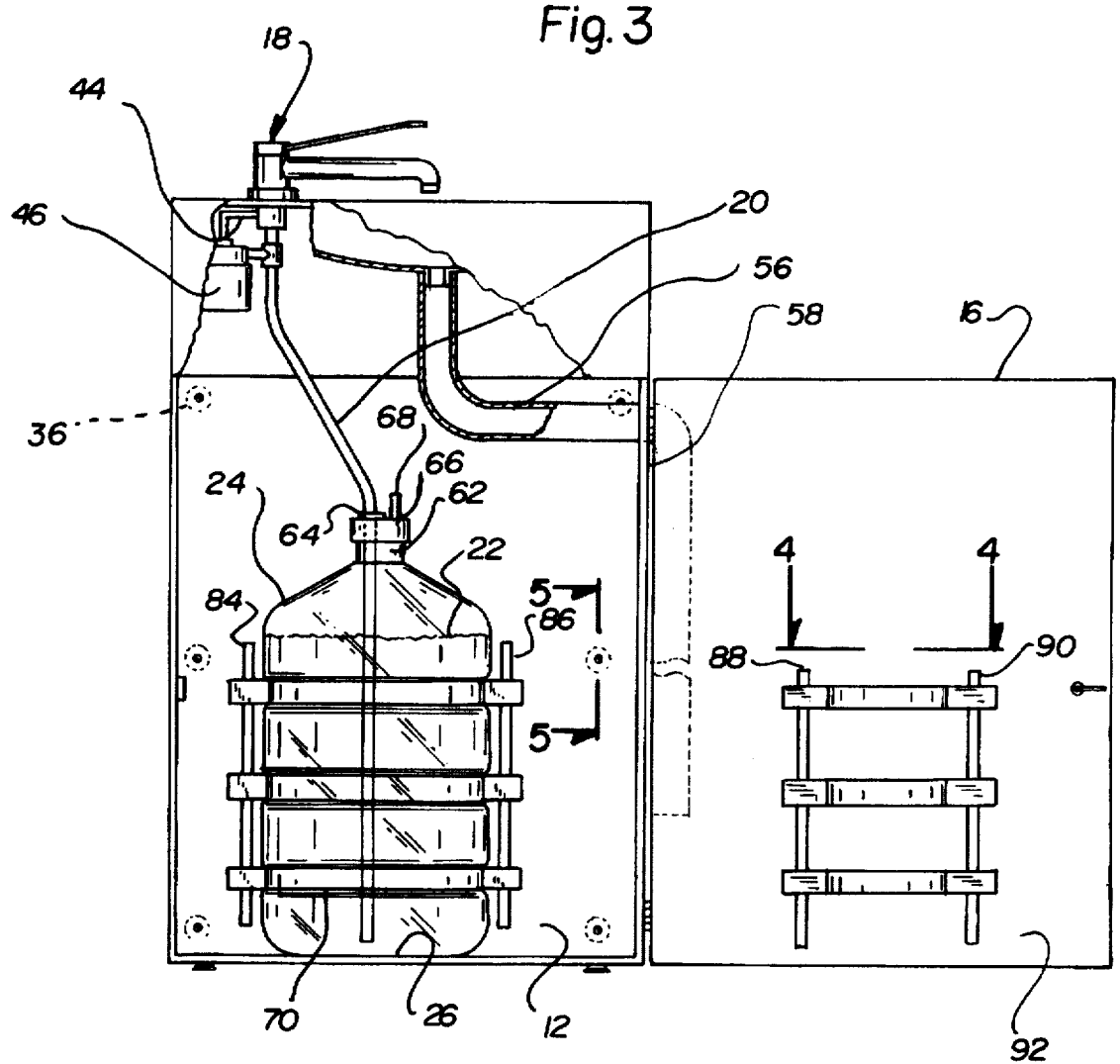
FIG. 3 is a front elevation view of the invention showing the same in an opened condition.

With reference now to the drawings, and in particular to FIGS. 1–6 thereof, a new portable sink embodying the principles and concepts of the present invention and generally designated by the reference numeral 10 will be described.

More specifically, it will be noted that the portable sink 10 essentially includes a molded cabinet 12 having a topmost positioned, integral sink basin 14 and a front opening hingedly-attached door 16 which facilitates access to an interior thereof. Additionally, the cabinet 12 is provided with a topmost mounted hand pump 18 having a downwardly directed conduit 20 which is positionable within a supply of water 22 contained in a five gallon water jug 24. The conduit 20 is sized to allow it to extend to a position proximate the bottom 26 of the bottle 24, thereby to facilitate a complete emptying of the bottle of its supply of water 22 in a now understood manner.

To facilitate an attachment of the cabinet 12 to a raised shelf area 28 in a portable toilet 30, a plurality of suction cups, each of which is generally designated by the reference numeral 32, are provided on a bottom surface 34 of the molded cabinet 12. The suction cups 32 are attachable to the top pre-existing shelf surface 28 of the toilet 30 as best illustrated in FIG. 1. Additionally, a further series of suction cups, each of which is generally designated by the reference numeral 36, are provided on a rear surface 38 of the cabinet 12, and these suction cups 38 are designed to be attached against an upstanding plastic wall 40 forming a part of the portable toilet 30.

Figure 5:
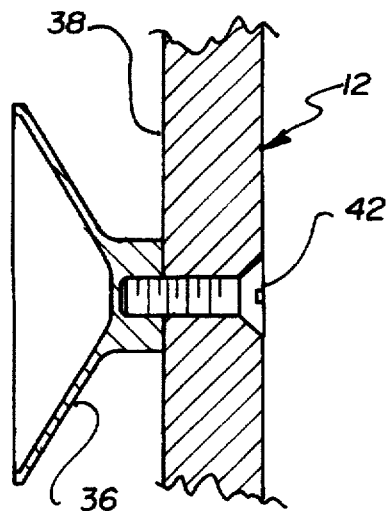
FIG. 5 is a cross-sectional view of the invention as viewed along the line 5—5 in FIG. 3.

The suction cups 36 are attached to the rear surface 38 of the cabinet 12 by threaded fasteners 42 as best illustrated in FIG. 5. This same method of attachment is applied for the suction cups 32 attached to the bottom surface 34 of the cabinet 12. As such, it can be seen that any number of suction cups 32, 36 can be easily attached to any surface on the cabinet 12 to effect a conforming fit of the cabinet within any type and shape of portable toilet 30.

Figure 6:
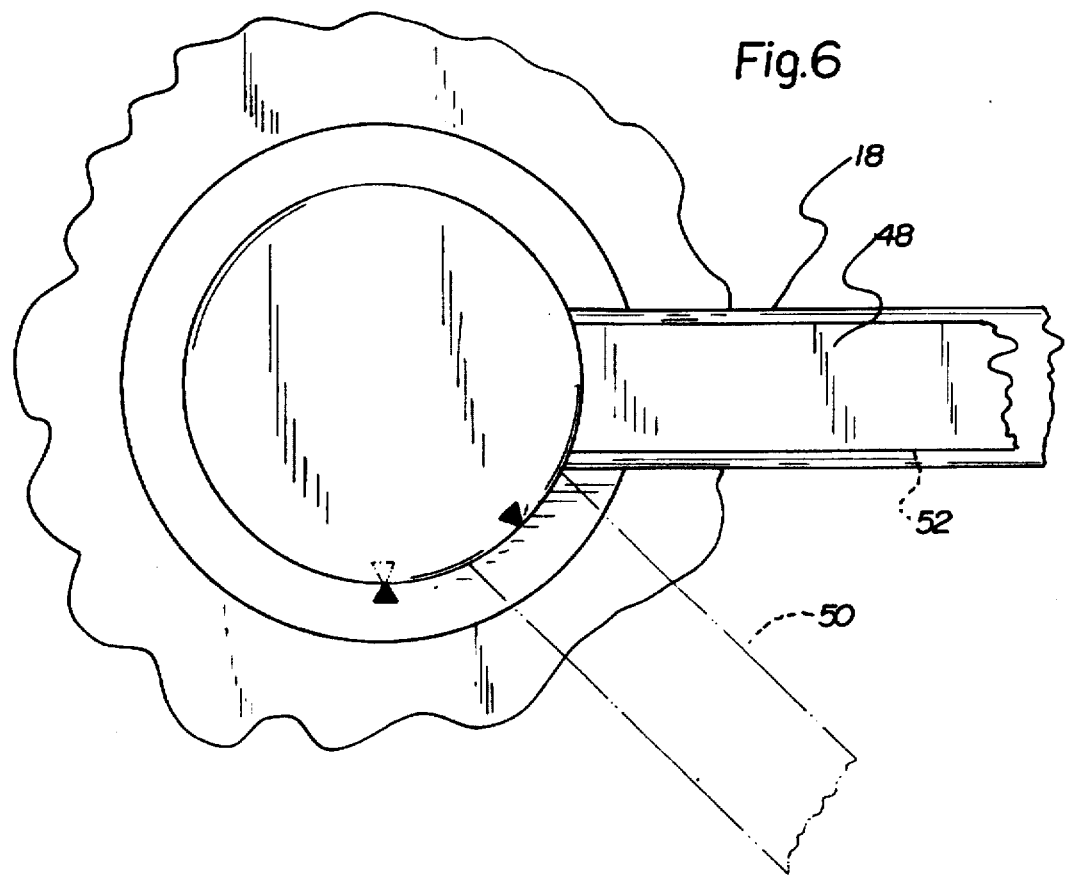
FIG. 6 is a top plan view of the valve assembly forming a part of the present invention.

The hand pump 18, in addition to having a conduit 20 for withdrawing water 22 from a bottle 24, is also provided with a branch conduit 44 which is in fluid communication with a container 46. The container 46 may be filled with a deodorizing soap and, as shown in FIG. 6, a top hand valve 48 on the hand pump 18 may be displaced to a side position 50 so that when it is pumped up and down, it will withdraw water 22 concurrently with a supply of the deodorizing soap. When moved back to a first position 52 as illustrated in FIG. 6, the supply of deodorizing soap from the container 46 is cut off, so that only rinsing water 22 is withdrawn from the bottle 24. The hand pump assembly 18 is commercially available and the valve configuration thereof does not constitute a part of the present invention.

The sink basin 14 is provided with a drain 54 attached to a conduit 56 that extends outwardly through a side wall 58 of the cabinet 12, and the drain conduit 56 is directed downwardly for discharge into a holding tank 60 forming a part of the portable toilet 30. As such, no liquid is discharged from the portable toilet 30 but is instead retained within the holding tank 60, and the deodorizer mixed with the soap from the container 46 will operate to deodorize the wastage held within the holding tank.

The water containing bottle 24 is provided with a stopper assembly 62 that includes a through-extending aperture 64 through which the water supply conduit 20 is directed. A second through-extending aperture 66 formed in the stopper 62 is receivable of a vent tube 68 so that a vacuum does not form above the water 22 within the bottle 24, thereby to facilitate a continuous flow of water from the bottle through the hand pump assembly 18 in a now understood manner.

Typically, commercially available five gallon water bottles are molded to include a plurality of peripherally extending indentations, each of which is generally designated by the reference numeral 70. A novel feature of the present invention involves the use of a plurality of flexible bracket members, all of which are generally designated by the reference numeral 72, and each of which is provided with a curvilinearly-shaped surface 74 designed to engage an encircling indentation 70 on a particular water bottle 24.

Figure 4:
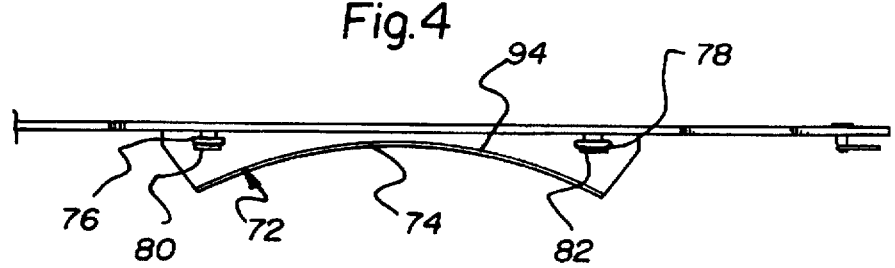
FIG. 4 is a cross-sectional view of the invention as viewed along the line 4—4 in FIG. 3.

Inasmuch as some water bottles are provided with two indentations 70, while others may be provided with three or even more, each bracket 72 is provided with a pair of oppositely disposed T-shaped slots 76, 78 as shown in FIG. 4. A forward facing surface of each T-shaped slot 76, 78 is lined with an interior ferrous metal strip 80, 82 respectively, and the T-shaped slots are slidably engagable over T-shaped bracket supports 84, 86 attached to a back surface of the cabinet 12 and also over T-shaped bracket supports 88, 90 attached to a rear face 92 of the door 16.

All of the bracket supports 84, 86, 88, 90 would be formed of a magnetic material in a preferred embodiment, whereby they would serve to hold a curvilinearly-shaped bracket 72 in a desired location after it has been slidably positioned thereover. Such a construction allows the bracket 72 to be slid up and down the bracket support members 84, 86 and 88, 90 in a now understood manner so as to be alignable with encircling indentations 70 on a particular design of water bottle 24.

A modified embodiment of the invention further includes a strip of magnetized tape 94 on the curvilinear surface 74 of a particular bracket 72, and in the event that a water bottle 24 was not provided with encircling indentations 70, ferrous metal strips could be wrapped around a bottle at a desired location so as to provide even further support by magnetically engaging a metal strip aligned with a particular bracket.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable sink for use in a portable toilet comprising:
   a cabinet;
   a sink basin mounted on a top surface of said cabinet;
   a water supply container removably mounted within said cabinet;
   a hand pump for delivering a supply of water from said water supply container to said basin;
   a drain means for facilitating a drainage of said supply of water from said sink basin; and
   a bracket means for securing said water supply container within said cabinet, wherein said bracket means include at least one slidably movable first flexible bracket mounted on a rear interior wall of said cabinet.

2. A portable sink for use in a portable toilet comprising:
   a cabinet;
   a sink basin mounted on a top surface of said cabinet;
   a water supply container removably mounted within said cabinet;
   a hand pump for delivering a supply of water from said water supply container to said basin;
   a drain means for facilitating a drainage of said supply of water from said sink basin; and
   a bracket means for securing said water supply container within said cabinet, wherein said bracket means include at least one slidably movable first flexible bracket mounted on a rear interior wall of said cabinet, wherein said bracket means further includes at least one second flexible bracket slidably positioned on an interior wall of a front mounted door on said cabinet.

3. The portable sink for use in a portable toilet as described in claim 2, wherein said first flexible bracket and said second flexible bracket are substantially alignable so as to frictionally engage said water supply container in a secure manner when said door on said cabinet is in a closed position.

4. The portable sink for use in a portable toilet as described in claim 3, and further including first and second bracket support members slidably engagable with said first flexible bracket, and further including third and fourth vertical bracket support members slidably engagable with said second flexible bracket.

5. The portable sink for use in a portable toilet as described in claim 4, wherein said first, second, third and fourth bracket support members are formed of a magnetic material, and said first and second flexible brackets are provided with ferrous metal strips alignable with said first, second, third, and fourth bracket support members, whereby said first, second, third and fourth bracket support members are magnetically attached to said first and second flexible brackets respectively, thereby to facilitate a selective slidable fixed positioning of said first and second flexible brackets to any desired position relative to said water supply container.

6. The portable sink for use in a portable toilet as described in claim 5, and further including deodorizing means deliverable through said hand pump to said portable toilet.

7. The portable sink for use in a portable toilet as described in claim 6, and further including first attachment means for attaching said cabinet in said portable toilet, said first attachment means comprising at least one suction cup positioned on a bottommost surface of said cabinet.

8. The portable sink for use in a portable toilet as described in claim 7, further including second attachment means for attaching said cabinet to said portable toilet, said second attachment means comprising at least one suction cup on a rear wall of said cabinet.

* * * * *